(No Model.)
E. SCHMIDT.
WEED CUTTER.
No. 412,983.　　　　　　　　Patented Oct. 15, 1889.
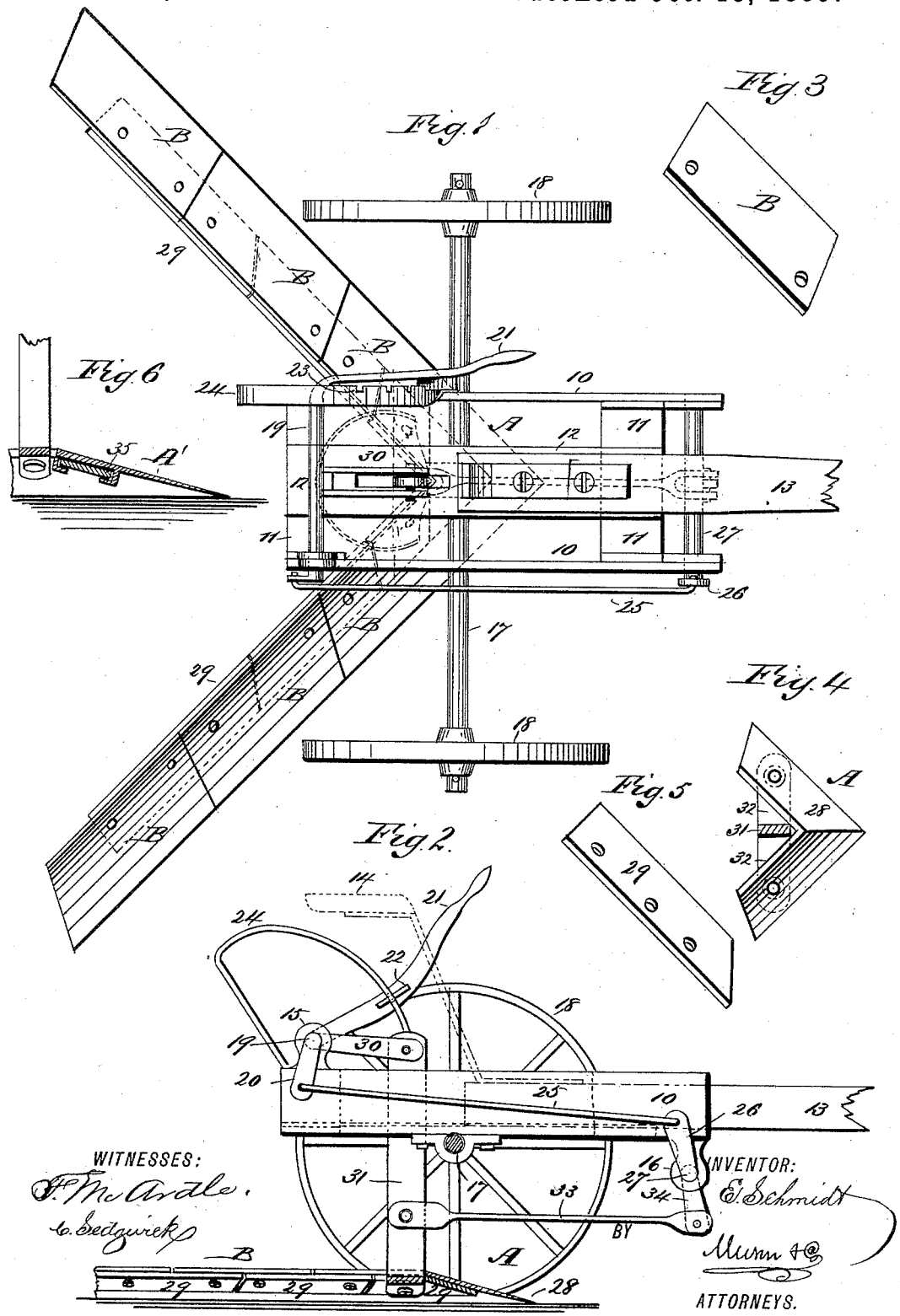
WITNESSES:
F. McArdle
C. Sedgwick
INVENTOR:
E. Schmidt
BY
Munn & Co
ATTORNEYS.

UNITED STATES PATENT OFFICE.

ERICH SCHMIDT, OF MARYSVILLE, CALIFORNIA.

WEED-CUTTER.

SPECIFICATION forming part of Letters Patent No. 412,983, dated October 15, 1889.

Application filed May 18, 1889. Serial No. 311,315. (No model.)

*To all whom it may concern:*

Be it known that I, ERICH SCHMIDT, of Marysville, in the county of Yuba and State of California, have invented a new and useful Improvement in Weed-Cutters, of which the following is a full, clear, and exact description.

My invention relates to an improved weed-cutter, and has for its object to provide an implement of this description wherein the heel of the share may be raised or lowered in a line parallel with the point; and a further object of the invention is to provide an implement of simple and durable construction wherein the share may be so regulated as to cut any width of swath desired.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1 is a plan view of the implement. Fig. 2 is a side elevation of the same, the share being in transverse section at the point. Fig. 3 is a perspective view of one share-section removed. Fig. 4 is a plan view of the point of the share. Fig. 5 is a detail perspective view of the end tie-plate or frog, and Fig. 6 is a transverse section through a modified form of blade.

In carrying out the invention the body of the device is preferably made in skeleton form, and usually consists of side bars 10, united at the front and at the back by cross-bars 11, and provided with a central longitudinal bar 12, secured to the cross-bars, to which central longitudinal bar the tongue 13 is attached, the seat 14 being secured to the upper rear end of the said tongue, as shown in Fig. 2. At the rear of each side bar a bracket 15 is upwardly projected, and from the under side of the said side bars at the front similar brackets 16 are downwardly projected. The body is preferably supported upon the axle 17, upon which drive-wheels 18 are journaled.

In the brackets 15 a rock-shaft 19 is journaled, provided with a downwardly-extending crank-arm 20, integral with one end, and an upwardly-projecting handle or lever-arm 21, secured to the opposite end, which lever-arm is provided upon its inner face with a boss 22, capable of engaging with any one of a series of notches 23, produced in the outer edge of a rack 24, said rack being rigidly secured to one of the side bars 10 of the body.

The crank-arm 20 of the rock-shaft 19 is united by a connecting-rod 25 with a similar crank-arm 26, integral with a rock-shaft 27, journaled in the forward body-brackets 16, whereby as the rear rock-shaft is moved an equivalent movement is imparted to the forward rock-shaft.

The share of the implement is made in sections, comprising an angle-section A, which constitutes the point, and a series of side sections B, adapted to form a continuation of the point-section. Each section is made up of a blade 28, which stands at an angle to the ground, the upper and lower faces thereof being upwardly inclined, as shown in Fig. 4, and a tie-bar or frog 29, bolted to the under face of each knife or blade near its upper edge, the frog or tie-bar of the toe-section being angular and the remaining tie-bars or frogs straight. The extremities of the intermediate sections, however, are beveled in opposite directions, the end tie-bar or frog being beveled at the inner extremity only, as shown in Fig. 5.

The extremities of each of the side blade-sections B, as shown in Fig. 3, are beveled in similar manner to the tie-bars or frogs. In making up the share any desired number of the side blades or cutters may be used in connection with the point, the number of side blades or cutters being regulated by the width of the swath to be cut. Thus if a very narrow swath is to be cut the forward point alone may be employed. If a wider swath is desired, one blade or cutter is added at each side, and if a yet wider swath is to be cut two or more of such blades may be added. The opposed beveled edges of the said blades are made to contact closely, and the tie-bars or frogs are secured upon the under side of said blades or cutters in such manner as to break joints with the latter, as illustrated in Fig. 1. The opposed ends of the tie-bars or frogs are likewise made to closely contact. The tie-bars or frogs are preferably secured to the blades by means of screws.

The share at the point is united with the rear rock-shaft 19, and to that end an arm 30 is forwardly projected from the center of the said rock-shaft, and to the extremity of said arm a post 31 is pivoted, the lower end of which post is provided with two oppositely-extending essentially horizontal members 32, as shown in Fig. 4, which members are secured, respectively, to the angled tie-bar or frog at the point of the share, and one end of a pitman 33 is pivoted to the forward edge of the said post a slight distance above its connection with the share, as shown in Fig. 2, the opposite end of the said pitman being pivoted to an arm 34, projected at a right angle downward from the forward rock-shaft 27.

It will be observed in operation that by reason of the pitman-connection between the vertical post of the share and the forward rock-shaft and the link-connection between the said forward rock-shaft and the rear rock-shaft when the arm 21 is manipulated to raise or lower the share the heel of the share must ascend and descend in a line parallel with the point, and it will be further observed that any number of side blades or cutters may be employed in forming the share as may be desired or found necessary to cut the required width of swath.

In Fig. 6 I have illustrated a modified form of blade A', in which the said blade is provided upon the under surface, at the upper end, with slideways 35. When the blades are thus formed, the tie-bar or frog is made in one piece of sufficient length to receive a number of blades, and the blades are secured to the tie-bar or frog by causing the latter to enter the slideways of the former.

Having thus described my invention, I claim as new and desire to secure by Letters Patent—

1. In a weed-cutter, the combination, with a body, a forward and a rear rock-shaft journaled upon the said body, a link connecting the said rock-shafts, and a vertical post connected with the rear rock-shaft, of an angular share secured to the said vertical post near its point and a pitman connecting the said post above the share with the forward rock-shaft, substantially as shown and described, whereby, when the rear rock-shaft is manipulated to raise or lower the share, the heel of the share will rise or fall in a line parallel with the point, as specified.

2. The combination, with a body, of a vertically-adjustable angled share carried thereby, said share comprising a series of cutting-blades and tie-plates or frogs secured to the under face of said blades and rigidly holding the opposed ends in contact, substantially as shown and described.

3. The combination, with a body, of a vertically-adjustable angled share carried thereby, said share comprising a series of cutting-blades and a series of tie-plates or frogs secured to the under side of said blades, holding the ends thereof in rigid contact, the said tie-plates being arranged to break joints with the blades, and means, substantially as shown and described, for raising and lowering the said share, as set forth.

4. A sectional share for weed-cutters, comprising an angled point, a series of side blades, and a series of tie-plates or frogs secured to the under side of the several blades, and the vertical post or standard provided with laterally-extending members adapted to be secured to the under side of the angle tie-bar or frog, substantially as shown and described.

ERICH SCHMIDT.

Witnesses:
CONRAD SCHULER,
FRANK E. SMITH.